Figure 1:
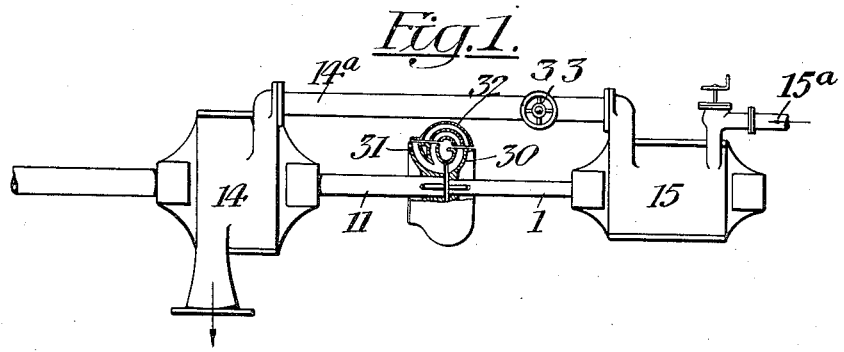

H. FÖTTINGER.
TURBINE PLANT.
APPLICATION FILED FEB. 26, 1914.

1,199,363.

Patented Sept. 26, 1916.

WITNESSES
Leonora R. Nicholsburg
E. Coltran

INVENTOR
Hermann Föttinger
BY
C. W. Fairbank
ATTORNEY

UNITED STATES PATENT OFFICE.

HERMANN FÖTTINGER, OF ZOPPOT, NEAR DANZIG, GERMANY, ASSIGNOR TO FIRM OF STETTIN-MASCHINENBAU-ACTIEN-GESELLSCHAFT "VULCAN," OF STETTIN, GERMANY.

TURBINE PLANT.

1,199,363.  Specification of Letters Patent.  Patented Sept. 26, 1916.

Original application filed June 19, 1906, Serial No. 322,395. Divided and this application filed February 26, 1914. Serial No. 821,128.

*To all whom it may concern:*

Be it known that I, HERMANN FÖTTINGER, a subject of the German Emperor, and resident of Zoppot, near Danzig, in the Empire of Germany, have invented certain new and useful Improvements in Turbine Plants, of which the following is a specification.

This invention relates to certain improvements in turbine plants, and more particularly to plants in which two or more gas or steam turbines of different normal running speeds, transmit their power to a single driven member.

My invention is particularly useful on ships where economy of space is highly desirable, although it is evident that it may be utilized for power purposes on land and in connection with driven members other than ship propellers.

One of the main difficulties, incidental to the economical utilization of turbines on ships, is dependent upon the fact that ordinary turbines operate with greater efficiency the higher the speed of rotation, and the ordinary ship propellers operate most efficiently at a comparatively low speed of rotation. Both the propeller and the turbine have their own particular speed of maximum efficiency and to drive either the propeller or the turbine at a greater or lesser speed in order to vary the speed of the ship results in a decrease of efficiency. Furthermore, the ordinary turbine is designed to be driven by fluid pressure in one direction only, and therefore, auxiliary turbines or turbine sections are necessary for use in backing the ship. Slow running turbines necessitate, theoretically at least, the use of blades as large as possible in order to avoid to the maximum extent space loss in the high pressure part and this is often difficult to provide especially in the present ship driving turbines.

In order to avoid the uneconomical working of the main steam turbines at low rotative speeds, and under low load there has been provided heretofore an auxiliary turbine of lower normal speed and capacity, in front of the main turbine. On ships this low speed turbine for driving the ship at low or sub-normal speeds, has been directly coupled to the main turbine and permitted to run empty with the latter when the ship is traveling at full speed. In addition to the main turbine and the auxiliary turbine, it has been necessary to provide a third turbine designed for rotation in the opposite direction and for use in backing movements of the ship. Thus, the plant has become very complicated and expensive and many of the advantages for the use of turbines on ships in place of reciprocating steam engines have been lost.

By means of my invention I make it possible to secure all of the advantages incidental to the use of turbines and at the same time to avoid the disadvantages above mentioned.

In carrying out my invention I insert transmission gearing between the high pressure part of the turbine plant and the low pressure part whereby each may run at its own speed of maximum efficiency, the high pressure part making a greater number of revolutions per minute than the low pressure part. When utilizing my invention on ships the low pressure turbine may be directly connected to the propeller shaft, and the disadvantages as far as economy is concerned are largely eliminated because the low pressure part may run at the speed of highest propeller efficiency and still fully utilize the low pressure exhaust steam from the high pressure part. The transmission gearing is so designed that its transmission ratio corresponds to the relative normal speeds of the high pressure fast running part, and the low pressure slow running part, so that both turbines or turbine parts deliver their power to the propeller shaft and from each there is obtained the maximum attainable efficiency. I preferably employ a hydraulic power transmitter of a type which can be easily reversed or can be disconnected by withdrawing the fluid therefrom, and preferably one in which the transmission ratio is slightly variable under varying conditions of speed and load. The speed ratio of the two turbines may thus vary and the power transmitter will act as an equalizer so that each turbine will at all times contribute its proportionate part of the power required to drive the propeller, or other driven member. By regulating or controlling the power transmitter, the number of rotations, and the direction of rotation of the propeller can be changed in a very simple manner.

By means of my invention I obtain a turbine plant requiring the minimum space and possessing the maximum simplicity and economy. The loss of energy in the power transmitter is more than compensated for by the more efficient working of the turbines and of the propeller at own individual speeds of maximum efficiency and by the elimination of the normally empty turbine formerly used for reversing.

It is of course evident that two power transmitters could be used between the stages of a three stage turbine, and that the number of separate power transmitters will increase directly with the number of stages of the turbine or the number of turbine parts.

This application includes subject matter divided out of my prior and co-pending application Serial No. 322,395, filed June 19, 1906, and all of the claims of the present application are based on structure there disclosed. The power transmitter which is preferably employed in the present invention operates on the principle disclosed in said parent application.

Reference is to be had to the accompanying drawings, in which similar reference characters indicate corresponding parts throughout the several views, and in which—

Figure 2:
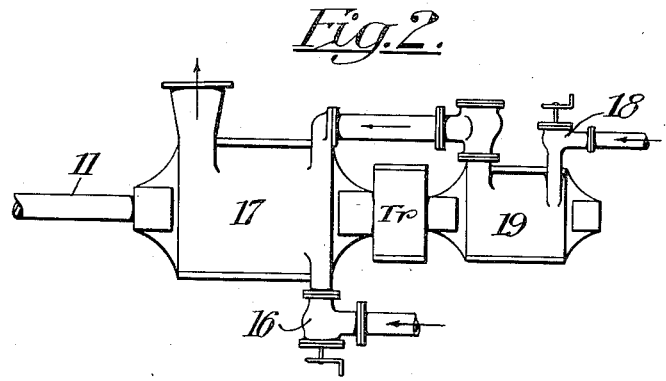
Figure 3:
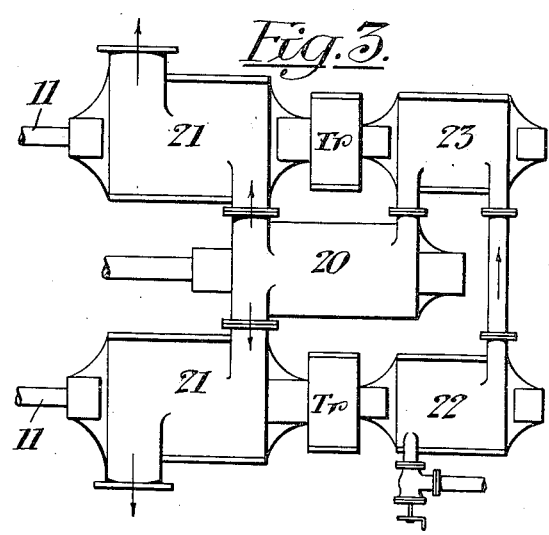

Figure 1 is a somewhat diagrammatic representation of a turbine plant embodying my invention; Fig. 2 is a similar view of a second arrangement which I may employ, and Fig. 3 is a similar view of a still further arrangement which I may employ.

One way in which I may carry out my invention is illustrated somewhat diagrammatically in Fig. 1. The turbine is made up of two separate parts including a high pressure, high speed part 15, and a low pressure, low speed part 14. The axes of the two turbine parts are preferably in alinement, and the shaft II of the low pressure part has the ship propeller (not shown) directly connected thereto. The steam or other motive fluid is delivered first to the high pressure high speed part 15 through an inlet 15ª, and the exhaust of the latter is normally delivered directly to the inlet of the low pressure part 14, through a by-pass 14ª. Between the two turbine parts and connecting the shaft I of the high pressure part 15 to the shaft II of the low pressure part 14, is a power transmitter T𝑟. Although I do not wish to be limited to any specific form of power transmitter I preferably employ one designed in accordance with the invention disclosed and claimed in my prior application above referred to. In this power transmitter there is no mechanical connection between the driving and driven parts, the power being transmitted by the kinetic energy of liquid thrown by a driving part, and impinging upon a driven part.

Merely as an example of a hydraulic power transmitter which I may employ, I have shown in Fig. 1, the shaft of the high pressure high speed part 15 of the turbine provided with a centrifugal pump impeller, in the form of a vaned or bladed wheel 30 adapted to deliver liquid by centrifugal force in a direction having a radial component. The low pressure low speed turbine part 14 has on its shaft a somewhat similar wheel 31, having two sets of vanes or blades against which the fluid may impinge so as to drive said wheel. Concentric with the driving and driven wheels 30 and 31 is a non-rotatable axially movable liquid guiding section 32. This section has two sets of passages, the vanes in one adapted to direct the liquid against one set of vanes of the driven member to rotate said driven member in one direction and the vanes in the other adapted to change the direction of flow of the liquid and deliver it against the other set of vanes of the driven member to rotate the latter in the opposite direction. Either of the two sets of guiding passages may be brought into operative position by the proper axial movement of the guiding section. The transmission of power may be interrupted by withdrawing the liquid from the transmitter. The driving and driven parts of the transmitter may be designed to give any desired transmission ratio and this transmission ratio should be the same as or approximately the same as the normal relative speeds of the two turbine parts.

In the normal use of the plant shown in Fig. 1, on a ship for driving the propeller at full speed, the steam is delivered from one turbine part to the other and all of the power from both turbine parts will be transmitted to the ship's propeller. When it is desired to back the ship a valve 33 may be operated so that the exhaust steam from the high pressure part will not go to the low pressure part, thus permitting the latter to run empty and the guide section of the power transmitter may be shifted so that the shaft II will be caused to rotate in the reverse direction from that of the shaft I, and the high pressure turbine part 15. Thus, with the ship traveling forward at high speed reversing may be secured by merely turning the valve 33 and shifting the power transmitter guide section and without interrupting the continuous forward rotation of the high pressure turbine part 15. For driving the ship at low speed the high pressure turbine 15 may be cut out and steam delivered directly to the low pressure part 14.

In Fig. 2 I have shown a somewhat different arrangement in which two turbine parts 17 and 19 are employed the former being the main turbine for driving the ship at normal speed and the latter being a cruising turbine, which is only employed in case a low speed of ship travel is desired. At full speed the steam is admitted through the valve 16, and drives the main turbine 17, the liquid having been withdrawn from the power transmitter Tr and the turbine part 19 being at rest. When it is desired to travel at low speed steam is admitted past the valve 18 to the turbine part 19 and the exhaust from the latter may or may not be delivered to an inlet of the main turbine 17. The power of the turbine 19 will be transmitted to the propeller shaft to drive the ship at such low speed as is necessary in maneuvering for anchorage or approaching a dock or pier. For backing the direction of rotation may be reversed in the power transmitter, but in this case the exhaust from the turbine 19 would not be delivered to the turbine 17. It is of course evident that if the turbine 17 has a normal speed higher than that at which it is desired to drive the propeller, a second power transmitter may be employed between the shaft of the turbine 17 and the propeller.

In Fig. 3 I have shown an arrangement applicable to the well-known 3 shaft arrangement on ships. In this construction the high pressure turbine 22 is connected to a low pressure turbine 21 in alinement therewith and by a transmitter Tr and a low pressure cruising turbine 23, is connected to a second low pressure turbine 21, by a second transmitter Tr. Between the two is a low pressure turbine 20 on a third shaft. The steam may be delivered from one turbine to another as is clearly indicated by arrows on the drawing. It is of course evident that other arrangements could be employed and I wish it particularly understood that I am not restricted to the particular transmitter illustrated in Fig. 1, as other forms may be employed for carrying out my invention.

Having thus described my invention, what I claim as new and desire to protect by Letters Patent, is:

1. A turbine plant, including a driven shaft, a slow running turbine part mounted thereon, a fast running turbine part, and means for transmitting power from said fast running turbine part to said driven shaft including a turbine wheel upon said driven shaft and a centrifugal pump impeller driven by said fast running turbine part and adapted to direct liquid to said turbine wheel whereby the same is actuated by the kinetic energy of said liquid.

2. A turbine plant, including a high speed turbine part, a propeller shaft, a low speed turbine part mounted directly upon the latter, and means for transmitting power from the former to the latter including a member rotated by said high speed turbine part and adapted to direct a liquid in a direction which has a radial component, and a member connected to said low speed turbine part and juxtaposed to said first mentioned member and adapted to be driven by the kinetic energy of the liquid delivered by said first mentioned member.

Signed at Danzig, Germany, this ninth day of February, 1914.

Dr. HERMANN FÖTTINGER.

Witnesses:
 ERNST SPRUNERK,
 MARTA A. FRIESE.